Patented Apr. 18, 1950

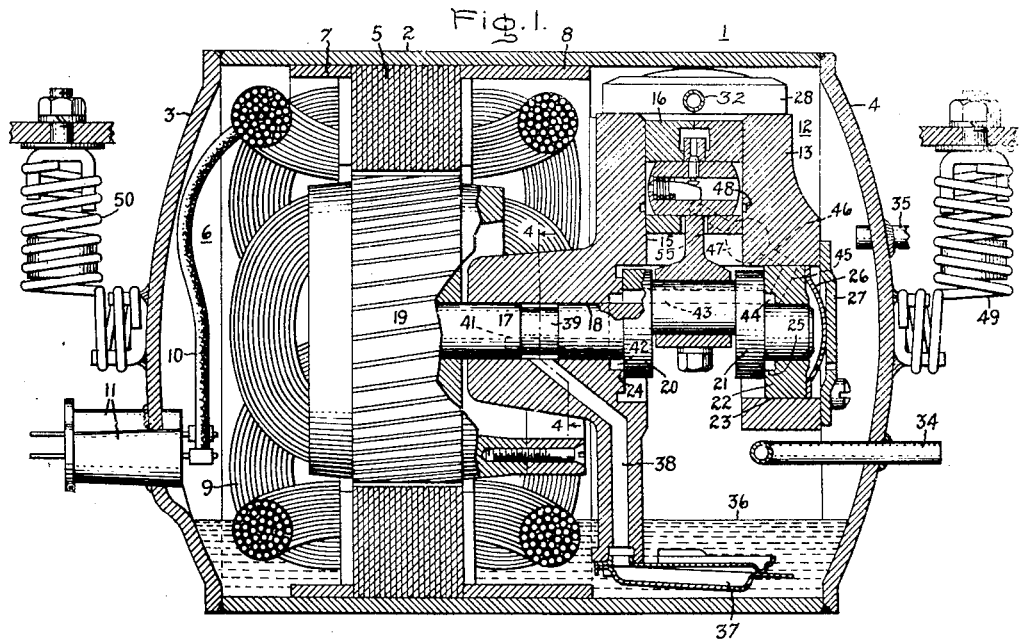

2,504,748

UNITED STATES PATENT OFFICE 2,504,748

COMPRESSOR LUBRICATING SYSTEM

Christian Steenstrup, Schenectady, N. Y., assignor to General Electric Company, a corporation of New York Original application June 20, 1944, Serial No. 541,145. Divided and this application May 29, 1945, Serial No. 596,498

3 Claims. (Cl. 184—6)

1

My invention relates to compressors for refrigerating machines and the like and particularly to lubricating systems for such compressors. This application is a division of application Serial No. 541,145, filed June 20, 1944, now Patent No. 2,394,409, and assigned to the same assignee as the present application.

Refrigerant compressors for household refrigerators are required to operate in locations where the noise level is low, and it is desirable to eliminate or minimize all noises produced by the normal operation of the compressor. In order to insure a minimum of wear and of noise it is desirable to provide an adequate supply of lubricant which preferably is maintained at some predetermined pressure throughout the operation of the compressor. Sudden changes in pressure, however, may produce noise in the lubricant supply system and it is desirable to regulate the pressure of the lubricant and prevent sudden changes in pressure. Accordingly it is an object of my invention to provide a compressor for refrigerating machines and the like including an improved device for regulating the pressure of the lubricant and preventing sudden changes in pressure.

The details of my invention are set forth in the following description and the features of novelty which characterize my invention will be pointed out with particularity in the claims annexed to and forming a part of this specification.

For a better understanding of my invention reference may be had to the accompanying drawing in which Fig. 1 is a longitudinal side elevation, partly in section, of a hermetically sealed refrigerant compressor embodying my invention; Fig. 2 is an end view of the compressor shown in Fig. 1 with the casing cut away and with portions of the compressor shown in section; Fig. 3 is an enlarged view of the lubricant pressure regulator illustrated in Fig. 2; and Fig. 4 is a sectional view on line 4—4 of Fig. 1 showing the construction of the lubricant pump.

Referring now to Figs. 1 and 2, I have provided a hermetically sealed motor-driven refrigerant compressor unit 1 including a cylindrical shell 2 having end plates 3 and 4 welded or otherwise suitably bonded thereto to form an enclosing casing. The shell 2 is constructed preferably of steel and constitutes the frame in which is supported a laminated core structure 5 of an alternating current driving motor 6. The laminations 5 are held in place between annular rings 7 and 8 which are welded or otherwise suitably secured to the shell 2. The motor is provided with stator windings 9 which are energized through leads 10 passing through sealed fittings 11 to the exterior of the casing. A compressor 12 is arranged within the casing 1 and comprises a cylinder

2 block 13 which is rigidly secured to the ring 8 by suitable bolts or screws 14. The cylinder block 13 is provided with a cylinder 15 in which is located a piston 16. The piston is driven by a crank shaft 17 mounted in a bearing 18 in the block 13, the motor 6 being provided with a squirrel cage rotor 19 mounted on the shaft 17. The shaft 17 is provided with annular shoulders 20 and 21 on either side of the crank and the end of the shaft remote from the motor 19 is mounted in a bearing block 22 which is slidable axially in a circular opening 23 in the cylinder block 13. The shoulders 20 and 21 are mounted in running engagement with annular thrust bearings 24 and 25, respectively, and are retained in position by a dished bridging member or disk 26 in cooperation with a movable camming member or adjusting plate 27. The compressor is provided with intake and exhaust valves (not shown) which are located within a cylinder head 28. Refrigerant gas which is admitted to the compressor through a pair of intakes 29 flows through an intake muffler 30 and thence into the compressor head through a conduit 31. The gas compressed within the cylinder 15 by operation of the piston 16 is discharged through a connection 32 into an exhaust muffler 33 and flows from the exhaust muffler and out of the casing through a conduit 34 to the circuit of the refrigerating system (not shown). Vaporized refrigerant returning from the refrigerating system is admitted to the casing through a suction line or return conduit 35.

In order to lubricate the compressor, a body of oil or lubricating fluid is maintained in the casing 1 to a level indicated at 36. Lubricant is withdrawn from the sump through a velocity reducing intake baffle 37 and an intake passage 38 in the block 13 by operation of a pump 39 the details of which are shown in Fig. 4. The intake baffle 37 prevents the admission to the pump of gaseous or liquid refrigerant and also of particles of foreign matter which may collect in the bottom of the casing. This intake baffle construction is the invention of Carl H. Steenstrup and is described and claimed in application Serial No. 541,143, filed June 20, 1944, now Patent Number 2,485,417, and assigned to the same assignee as the present invention. The pump 39 comprises an eccentrically formed section of the shaft 17 and a spring-pressed vane 40 for separating the intake and exhaust sides of the pump. During the operation of the pump, lubricant is drawn in through the duct 38 and is discharged through a duct 41 formed as a groove in the walls of the shaft bearing. The oil enters an annular passage 42 about the shaft adjacent the thrust bearing 24 and flows through the passage 43 in the crank shaft to an annular groove 44 in the bearing block 22. From the groove 44 the oil flows through a passage 45 in the block 22 to a passage 46 in the cylinder block 13, these two passages being maintained in registry by keying or otherwise securing the block 22 against rotation in the opening 23. The passage 46 conducts the oil to an oil pressure regulator 47 of the spring-pressed piston type. Oil discharged from the regulator 47 then flows through a duct 55 to an annular groove 48 about the walls of the cylinder 15 to lubricate the piston 16. It is thus apparent that oil is supplied to all moving parts of the compressor assembly.

The motor compressor unit may be supported in any suitable manner on the structure with which it is to be employed and has been illustrated as resiliently suspended on springs 49 and 50 at either end thereof. During the operation of the compressor, lubricant which is supplied to all the moving parts thereof reduces noise and wear. However, sudden changes in lubricant pressure such as might be caused by movement of the regulator piston 47a to control the flow of lubricant through the exhaust port indicated at 54 may tend to produce objectionable noise and it is therefore desirable to prevent sudden changes in pressure of the oil throughout the operation of the compressor. The pressure regulator 47 is provided for this purpose. The details of the regulator are more clearly shown in Fig. 3 in which the regulator piston designated 47a is shown mounted in a cylinder 51 and pressed toward the left by a spring 52 which is compressed between the piston 47a and a disk 53 secured in the open end of the cylinder 51. The pressure of the oil entering the cylinder 51 through the passage 46 tends to move the piston 47a to the right in opposition to the force exerted by the spring 52. The intake port for the cylinder 51 is the upper end of the passage 46. The exhaust port of the cylinder at the lower end of the duct 55 is indicated at 54 and communicates with the annular passage 48 through the duct 55. During the operation of the refrigerating machine, the piston 47a moves back and forth across the exhaust port 54 depending on the pressure of the oil entering the cylinder 51 through the passage 46, and if the cutoff is sharp so that the flow of the stream of oil is suddenly started or stopped, noise is produced. In order to minimize the noise due to sharp cutoff, there is provided a bypass between the intake or upper end of the duct 46 and the exhaust port 54 which comprises an annular groove 56 arranged about the end of the piston 47a and communicating with the end of the cylinder 51 adjacent the intake port through a groove 57 formed in one side and across the top of the piston. The spring 52 is mounted between the piston and the stationary disk 53, and the piston 47a may rotate within the cylinder 51; however, since the groove 56 extends entirely about the piston, the bypass is maintained open between the inlet and exhaust ports of the cylinder 51 regardless of the position of the piston. Because there is always a flow of lubricant through the bypass during the operation of the mechanism, sharp cutoff is prevented and the noise is minimized. A damping action for the piston 47a is obtained by providing a small restricted opening 58 in the disk 53 to provide communication between the cylinder 51 and the interior of the casing 2 about the cylinder block 13. Oil or a mixture of oil and gas will fill the cylinder 51 back of the piston 47a, and the restricted opening 58 will limit the rate of passage of the fluid from the cylinder to the interior of the casing and thereby damp sudden movements of the piston 47a. This effects a further reduction of noise.

The pressure regulator described above provides a simple and rugged control element for maintaining a desired lubricant pressure and for insuring minimum noise which might otherwise be produced during the operation of the lubricating system.

What I claim as new and desire to secure by Letters Patent of the United States is:

1. In a compressor or the like having a pump for supplying liquid lubricant and a conduit for conveying the lubricant to the moving parts of the compressor, a lubricant flow regulating means including a spring-pressed piston arranged to control the flow of lubricant through the conduit, said regulating means including a bypass around said piston for affording a predetermined minimum flow of lubricant through the conduit to the moving parts of the compressor regardless of the position of said piston with respect to the conduit whereby noise produced by the sudden closing of the conduit is minimized.

2. In a compressor or the like having a pump for supplying liquid lubricant, means providing a conduit for conveying the lubricant to the moving parts of the compressor, said means including a cylinder having an inlet port at one end and an outlet port at one side and connected to form a portion of said conduit, a piston and a spring for urging said piston toward said end of said cylinder for controlling said outlet port in accordance with the pressure of the lubricant supplied to said cylinder, and a bypass around said piston for affording a predetermined minimum flow of lubricant through said conduit regardless of the position of said piston with respect to said outlet port whereby noise produced by the sudden cutting off of said port is minimized, said bypass comprising an annular recess extending around said piston near the end thereof and a groove in said piston providing communication between said recess and said end of said cylinder.

3. In a compressor or the like having a pump for supplying liquid lubricant and means providing a conduit for conveying the lubricant to the moving parts of the compressor, said means including a cylinder, a lubricant flow regulating means including a spring-pressed piston arranged to control the flow of lubricant through the conduit, said regulating means including a bypass around said piston for affording a predetermined minimum flow of lubricant regardless of the position of said piston with respect to the conduit whereby noise produced by the sudden closing of the conduit is minimized, and a cover for said cylinder for enclosing said piston therein and for providing a chamber at the rear of said piston adapted to be filled with fluid, said cover having a restricted opening therein whereby the fluid in said chamber damps movement of said piston.

CHRISTIAN STEENSTRUP.

REFERENCES CITED

The following references are of record in the file of this patent:

UNITED STATES PATENTS

| Number | Name | Date |
|---|---|---|
| 1,422,608 | Nord | July 11, 1922 |
| 1,665,366 | Jehle | Apr. 10, 1928 |